United States Patent Office 3,466,847
Patented Sept. 16, 1969

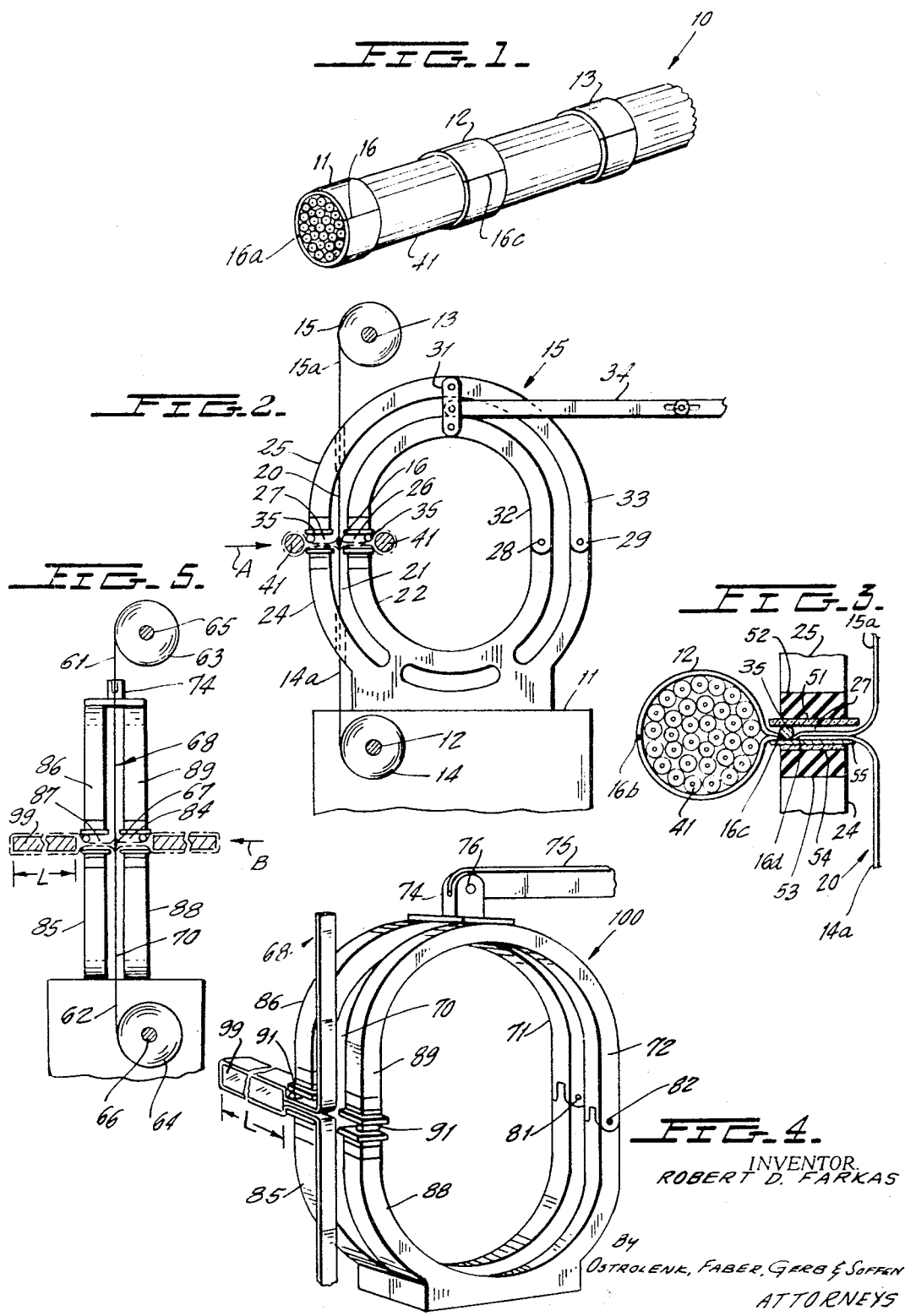

3,466,847
APPARATUS FOR FORMING AND
APPLYING BANDS
Robert D. Farkas, 5601 1st Ave.,
Brooklyn, N.Y. 11220
Filed Jan. 26, 1967, Ser. No. 611,980
Int. Cl. B65b 13/02, 13/34, 27/10
U.S. Cl. 53—198                        10 Claims

ABSTRACT OF THE DISCLOSURE

Tapes of oriented heat shrinkable thermoplastic material are drawn in opposite directions from individual tape supplies and are joined at their ends to form a holding web positioned between two sets of separable jaws. Each set of jaws mounts means for cutting and heat sealing thermoplastic material and each set of jaws is positioned on a different side of the holding web. An article moved forward, first through one set of jaws and then through the other set draws the holding web through the other set of jaws as the holding web loops around the article. When the article moves past the other set of jaws the latter is closed and the loop around the article is severed from the holding web with heat seals being applied to close the loop and also to join the remaining portions of the tapes to one another. By moving an article rearward, first through the other set of jaws and then through the said one set of jaws to a position rearward of the latter, the cutting and sealing means carried by the said one set of jaws is used to sever the loop from the holding web and to apply the heat seals as required.

---

The instant invention relates to apparatus for forming and applying heat sealable bands and more particularly relates to apparatus of this type which is extremely convenient to use in that the article to which the band is applied may be moved through the apparatus in either of two directions.

Film packaging and tape applying machines of the prior art utilizing heat sealable material have been extremely limited in use due in part to the fact that articles must be moved into the apparatus in only a single direction. Other prior art devices required band forming sections to be cut, then applied to the article, and then sealed closed. Such prior art devices are illustrated in U.S. Patent No. 3,172,246 issued Mar. 9, 1965 to S. L. Ruff on a Machine for Forming an Enclosure of Thermoplastic Sheet Material About an Article and U.S. Patent No. 2,881,577 issued Apr. 14, 1959 to H. A. McLaren on a Tool for Applying Heat Sealable Cable Bands.

The instant invention provides apparatus of the type previously noted but capable of greater utility in that the article to which the band is applied may be moved in either of two directions to form the band. As will hereinafter be seen, this is particularly advantageous in applying bands to wiring harnesses and permitting more than one person to use a single machine with convenience.

Briefly, the apparatus of the instant invention, just as in the machine of the aforesaid U.S. Patent No. 3,172,246, forms a bipartite or holding web by joining together the ends of thermoplastic webs fed from separate supplies to a juncture located adjacent to the gap between separable jaws mounting heat sealing and cutting means. The article to be banded is moved along a path which is blocked by the holding web so that the latter is drawn through the jaws forming a loop around the article. After the article passes through the jaw opening the jaws are closed, the loop is severed from the holding web and heat seals are applied to close the loop around the article and to secure the ends of the tapes together where the loop has been severed from the holdnig web. If it is desired to apply another loop or band around the previously formed band, the article is merely moved in the reverse direction through another set of jaws. This latter movement forms a second loop around the article and draws material from the holding web through the second set of jaws. The second set of jaws is closed and cutting and heat sealing means carried thereby severs the second loop from the holding web and applies heat seals to close the second loop and to join the ends of the tapes at the point where the second loop has been severed from the holding web.

Accordingly, a primary object of the instant invention is to provide novel apparatus for forming and applying bands to articles.

Another object is to provide apparatus of this type constructed so that the article to which the loop is being applied may be moved in more than one direction for formation and application of the loop.

Still another object is to provide apparatus of this type in which there are two sets of jaws each carrying an individual cutting and sealing means with the jaws being spaced from one another to provide a passage for tapes moving in opposite directions from individual supplies and joined at the ends thereof in the region of the sets of jaws to provide a bipartite web which may be selectively drawn through the jaws of either set.

These as well as other objects of this invention will become readily apparent after reading the following description of the accompanying drawings in which:

FIGURE 1 is a fragmentary perspective illustrating a bundle of wires secured by thermoplastic bands applied by apparatus constructed in accordance with the teachings of the instant invention.

FIG. 2 is a side elevation showing the essential elements of apparatus for applying the bands illustrated in FIGURE 1.

FIGURE 3 is an enlarged view, showing a fragmentary portion of FIGURE 2, to clearly illustrate the apparatus elements at the time when the band is being severed from the holding web.

FIGURE 4 is a perspective illustrating another embodiment of the instant invention.

FIGURE 5 is a front elevation of the apparatus illustrated in FIGURE 4.

Now referring to the figures. Cable 10 is constructed of a plurality of insulation covered wires bundled together by bands 11, 12, 13, which, as will hereinafter be explained, are applied by apparatus 15 of FIGURE 2. Bands 11–13 are preferably constructed of heat sealable plastic cross-oriented material known in the trade as "shrink material." Such material when heated to a particular temperature below the fusion temperature of the material will shrink. Even though bands 11–13 are somewhat loose at the time they are formed, shrinkage thereof cause them to tightly enwrap the wires comprising cable 10.

Apparatus 15 (FIGURES 2 and 3) includes stationary frame 11 providing pivotal mountings 12, 13 for supply rolls 14, 15, respectively, of thermoplastic tapes 14a, 15a, respectively, joined end to end by heat seal 16 to form holding web 20. Means, not shown, may be provided to tension tapes 14a, 15a as they are being drawn from rolls 14, 15. Holding web 20 extends through space 21 between pairs of jaws 22, 23 and 24, 25 with heat seal 16 being positioned generally in alignment with the respective gaps 26, 27 formed when the respective jaws 22, 23 and 24, 25 are separated.

Jaws 22 and 24 constitute parts of the stationary portions of generally C-shaped mounting members 32, 33, respectively, while jaws 23 and 25 constitute parts of the movable portions of the respective members 32, 33. Pins 28, 29 at the web sections of the respective members 32, 33 provide pivotal supports for the respective jaws 23, 25. Tie bar 31 mechanically connects jaws 23, 25 for movement in unison with such movement being effected by pivoted rod 34 connected at one end to tie bar 31 and at the other end to an operating mechanism (not shown).

Each of the movable jaws 23 and 25 carries a cutting and sealing means comprising wire 35 (seen most clearly in FIGURE 3) extending transverse to the longitudinal axis of portions of holding web 20 within space 21. As is well known to the art, wire 35 is of the resistance heating type so that upon the passage of sufficient current therethrough, wire 35 becomes hot enough to cut through a double thickness of holding web 20 with plastic flow taking place on both sides of the cut to form heat seals.

Wire 35 is heated intermittently in accordance with a heating and cutting technique known in the art as "impulse" heating. By particular reference to FIGURE 3, it is seen that a thin sheet of glass cloth 51 provides a thermal barrier between wire 35 and rubber insulator 52 mounted to the lower end of movable jaw 25. Another rubber insulator 53, topped by metal foil 54, is mounted at the upper end of stationary jaw 24. A thin layer of glass cloth 55 is mounted on top of foil 54. Naturally, duplicates of elements 51 and 52 are mounted to movable jaw 23 and duplicates of elements 53, 54, 55 are mounted to stationary jaw 22.

Operation of apparatus 15 proceeds in the following manner to form bands 11-13 around wire bundle 41. Jaws 23, 25 are separated from jaws 22, 24, respectively, to a point where gaps 26, 27 are larger than the diameter of bundle 41. An operator, either by hand or with a tool, holds bundle 41 with its longitudinal axis horizontal and moves bundle 41 at right angles to such axis in a direction (indicated by arrow A) transverse to the plane of holding web 20. This movement is also parallel to the plane of C-shaped mounting members 32, 33 with bundle 41 moving first through gap 27, then space 21, and finally through gap 26. Since the path for bundle 41 through space 21 is blocked by holding web 20, the latter folds around bundle 41 as bundle 41 moves through gap 26 to the position at the right thereof (shown in phantom in FIGURE 2). Rod 34 is operated to substantially close gaps 26, 27 bringing cutting and sealing wire 35 mounted to jaw 23 into engagement with the double thickness of holding web 20 disposed between jaws 22, 23. Electric power 35 is then applied to wire 35 causing heating thereof to a temperature which enables wire 35 to cut through the double thickness of holding web and fuse the material adjacent to the cut. When power is no longer applied to wire 35, the fused material cools forming heat seals 16a, 16b with the former heat seal 16a closing the loop 11 around bundle 41 and the latter heat seal 16b joining the remainders of tapes 14a, 15a end to end.

To apply band 12 it is not necessary to move bundle 41 around holding web 20. That is, with bundle 41 at the interior of member 32, bundle 41 is moved along its longitudinal axis to a position where band 12 is to be applied. The sets of jaws 22, 23 and 24, 25 are separated and bundle 41 is moved rearward (opposite to the direction indicated by arrow A) first through gap 26, next through space 21, and then through gap 27. With bundle 41 in a position just to the left of gap 27 in FIGURE 2, rod 34 is again operated to substantially close gaps 26, 27 bringing wire 35 mounted to jaw 25 into firm engagement with the double thickness of holding web 20 drawn between jaws 24, 25 by the movement of bundle 41 through space 21 and gap 27. Cutting and heat sealing power is then applied to this wire 35 severing loop 12 from holding web 20 and fusing the material on each side of the cut. When electric power to wire 35 is discontinued, this fused material cools forming heat seals 16c, 16d. Heat seal 16c serves to close band 12 while heat seal 16d serves to join the remaining portions of tapes 14a, 15a end to end.

By repeating the steps just recited, band 13 and other bands (not shown) of thermoplastic material are applied to bundle 41 at desired locations along its length. In some instances, it may be desirable to apply two or more overlying bands in which event bundle 41 is maintained in the same longitudinal position for successive movements through gaps 26, 27 and space 21. After the desired number of bands are applied to bundle 41, the assembly is subjected to low level heating which causes the bands around bundle 41 to shrink and thereby tightly hold the wires of bundle 41 together.

In the apparatus of FIGURE 2, the coplanar disposition of frame members 32, 33 makes apparatus 15 particularly convenient for applying bands around the circumference of elongated members. The embodiment of this invention illustrated in FIGURES 4 and 5 is particularly convenient for applying larger bands in that the article is moved along a path perpendicular to the plane of jaw movement rather than parallel to the plane of such movement as in the embodiment of FIGURE 2.

More particularly, in apparatus 100 of FIGURES 4 and 5, thermoplastic tapes 61, 62 extending from supply reels 63, 64, respectively, mounted to the respective stationary shafts 65, 66, are joined end to end at heat seal 67 to form bipartite holding web 68 which extends through space 70 between generally C-shaped frame members 71, 72. The latter are mounted side by side with the lower stationary portions thereof secured directly to table 73 and the upper movable portions thereof connected together for operation in unison by clevis 74 joined to operating rod 75 at pin 76. Pins 81, 82 provide pivotal mountings for the movable portions of the respective mounting members 71, 72. Member 71 is provided with jaws 85, 86 separated by gap 87 while member 72 is provided with jaws 88, 89 separated by gap 84. Each of the movable jaws 86, 89 mounts a heating and cutting wire 91 so positioned as to be operable upon layers of holding web 68 drawn into the respective gaps 84, 87.

Operation of the apparatus 100 is essentially the same as the operation for apparatus 15 so that no additional description will be given. However, it is noted that article 99 which is being banded is moved through gaps 84, 87 and space 70 along a path indicated by arrow B in FIGURE 5. Thus, the L dimension (FIGURE 4) of article 99 is not limited by the distance between gaps 84, 87 and the web sections of members 71, 72. Further, operators standing on opposite sides of apparatus 100 each may conveniently use apparatus 100.

While the embodiment of FIGURES 4 and 5 is constructed with all portions of mounting members 71, 72 disposed in single planes, additional flexibility is obtained by off-setting the web sections of both members 71 and 72 to positions considerably to the left or right (with respect to FIGURE 5) of gaps 84, 87. By so doing, apparatus 100 may be used to apply bands to elongated articles such as bundle 41.

In the foregoing description of the instant invention operation is described as having the apparatus stationary while the article being banded moves. Naturally, the apparatus may be constructed to be hand held, in which event the article is stationary as the bands are formed and applied.

It is noted that while electric impulse means are illustrated for sealing, other thermal means may be used for sealing the plastic material. In addition radio frequency and ultrasonic sealing means may be utilized. If the banding web is constructed of other than a thermoplastic material, compatible sealing and cutting means should be utilized.

Thus, it is seen that the instant invention provides novel apparatus for applying a multiplicity of thermoplastic bands to an article by utilizing two sets of cutting and sealing heads with the sets positioned on opposite sides of a bipartite web formed by joining the ends of tapes being drawn in opposite directions from separate supplies.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Apparatus for forming a closed loop of web material around an article, said apparatus including first means for sealing and cutting web material, second means for sealing and cutting web material, first jaw means to which said first means is mounted, second jaw means to which said second means is mounted, mounting means supporting jaws of said first jaw means for relative movement from a generally closed position, to an article receiving position wherein a first gap separates said jaws of said first jaw means, said mounting means supporting jaws of said second jaw means for relative movement from a generally closed position to an article receiving position wherein a second gap separates said jaws of said second jaw means, said first and second jaw means positioned such that in the region of said gaps there is a space measured transverse to said gaps, a first and a second web supply, first and second webs extending from said respective first and second supplies and means directing said webs in opposite directions into said space, said webs joined end to end at a seal in the vicinity of said gap to form a holding web extending generally perpendicular to and through a work path extending through said gaps whereby said holding web intercepts and loops around articles moved along said path in both forward and rearward directions, said first and second jaw means and said holding web positioned so that an article moving in said forward direction from a position rearward of said first gap first passes through said first gap and then through said second gap and is intercepted in said space by said holding web to draw said seal away from said first gap and form a loop around such article with said loop being closed and cut free of said holding web by said second means upon closing of said jaws of said second jaw means after said article is at a position forward of said second gap, said first and second jaw means and said holding web positioned so that further movement of such article in said rearward direction from a position forward of said second gap causes such article to first pass through said second gap and then through said first gap while being intercepted in said space by said holding web to draw said seal away from said second gap and form another loop around such article with said another loop being closed and cut free of said holding web by said first means upon closing of said jaws of said first jaw means after said article is in a position rearward of said first gap.

2. Apparatus as set forth in claim 1 in which said mounting means includes a frame having a web section positioned forward of said second jaws.

3. Apparatus as set forth in claim 2 in which said web section is disposed in a plane generally parallel to the direction of movement for said second jaws in moving between said generally closed and said article receiving positions.

4. Apparatus as set forth in claim 3 in which said mounting means supports said first and second jaws for movement is unison.

5. Apparatus as set forth in claim 1 in which said mounting means includes a frame having a web section positioned sideways of said second jaws.

6. Apparatus as set forth in claim 5 in which said web section is disposed in a plane transverse to the direction of movement of said second jaws in moving between said generally closed and said article receiving positions.

7. Apparatus as set forth in claim 6 in which said mounting means supports said first and second jaws for movement in unison.

8. Apparatus as set forth in claim 1 in which each of said webs comprises a tape constructed of thermoplastic material, said first and said second means each comprising means for severing said webs along a separation line and generating heat sufficient to form heat seals between said webs on both sides of the separation line.

9. Apparatus as set forth in claim 8 in which said first and second means sever said webs by utilizing heat generating means.

10. Apparatus as set forth in claim 9 in which said mounting means supports said first and second jaws for movement in unison; each of said tapes constructed of heat-shrinkable material.

References Cited

UNITED STATES PATENTS

| | | | |
|---|---|---|---|
| 2,741,885 | 4/1956 | Allison | 100—33 |
| 3,047,991 | 8/1962 | Siegel et al. | 53—182 |

THERON E. CONDON, Primary Examiner

E. F. DESMOND, Assistant Examiner

U.S. Cl. X.R.
100—33; 156—484